May 22, 1945. G. EGLOFF 2,376,532
PRODUCTION OF STYRENE
Filed Feb. 11, 1942
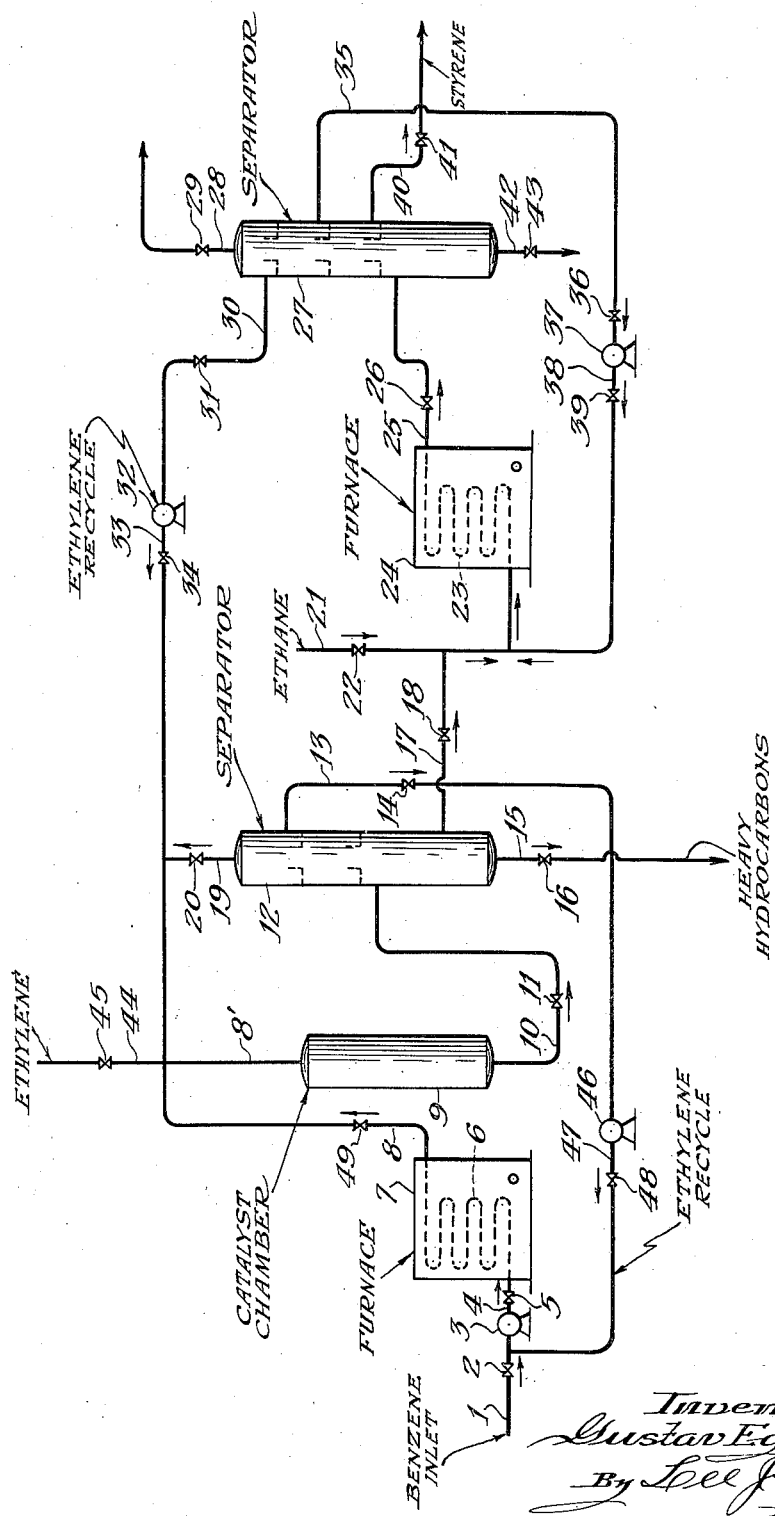
Inventor:
Gustav Egloff
By Lee J. Gary
Attorney.

Patented May 22, 1945

2,376,532

UNITED STATES PATENT OFFICE 2,376,532

PRODUCTION OF STYRENE

Gustav Egloff, Chicago, Ill., assignor to Universal Oil Products Company, Chicago, Ill., a corporation of Delaware Application February 11, 1942, Serial No. 430,482

3 Claims. (Cl. 260—669)

This invention relates to the production of styrene from alkylated aromatic hydrocarbons. More specifically it is concerned with a combination process wherein the olefinic alkylating agent is produced simultaneously with the production of the desired styrene, said olefinic agent being recycled to the alkylating step to produce the alkyl aromatic compounds from which the styrene is derived.

In a still more specific sense this invention comprises a method for the production of ethyl benzene by the ethylation of benzene with ethylene under specific conditions of operation when using specific catalysts and the thermal dehydrogenation of the said ethyl benzene in the presence of ethane whereby substantial yields of styrene and ethylene are produced. In recent years with the rapid expansion of the chemical industries the demand for the alkylated aromatics similar to those produced by the process disclosed herein has been steadily increasing. These compounds possess a high reactivity and it has been found that high molecular weight compounds formed by the polymerization of dehydrogenated alkyl aromatics are very valuable and have an extensive use in the varnish, plastic and synthetic rubber industries. The particular compound, styrene, formed by the process disclosed herein is particularly adaptable for the production of synthetic rubber since the polymers formed by the interaction of styrene and conjugated diolefins such as butadiene possess very desirable physical characteristics which are in some respects superior to those of natural rubber.

In one specific embodiment the present invention discloses a process for the production of styrene which comprises commingling benzene and ethylene and contacting the resulting mixture with an alkylating catalyst under conditions of operation suitable to produce a substantial yield of ethyl benzene, thermally dehydrogenating the ethyl benzene in admixture with ethane under operating conditions, adequate to produce a substantial yield of styrene and ethylene, recovering the styrene and recycling the ethylene separated from the higher boiling materials back to the alkylating.

One of the essential features of the present invention is the dehydrogenation of the ethyl benzene which has been diluted by the addition of a saturated paraffinic gas such as ethane. The addition of the saturated paraffinic gas such as ethane serves a twofold purpose and substantially increases the desirability and chemical adaptability of the process herein disclosed.

The operating conditions such as temperature, time of contact and pressure needed for the production of optimum yields of styrene by the dehydrogenation of ethyl benzene are similar to those under which ethane will undergo a substantial conversion to ethylene. Therefore, the addition of ethane to the ethyl benzene undergoing dehydrogenation provides a method for the production of one of the essential constituents necessary for the production of the ethyl benzene in a first alkylating step. A still more important advantage realized by the addition of the ethane to the ethyl benzene undergoing dehydrogenation is the fact that said ethane will act as a diluting or spacing agent thereby substantially decreasing the tendency for the styrene produced to undergo polymerization and to form undesirable high molecular weight compounds, during the reaction process.

Other advantages inherent in the invention disclosed herein will be adequately pointed out by the description of the accompanying diagrammatic sketch which illustrates in conventional side elevation one type of apparatus in which the objects of the invention may be accomplished.

Referring to the drawing a charging stock, and in this instance benzene, is introduced into the system through line 1 containing valve 2 into pump 3 which discharges through line 4 containing valve 5 into heating coil 6 disposed in furnace 7. The temperature to which a benzene will be heated during its passage through heating coil 6 disposed in furnace 7 will be dependent upon the type of catalyst utilized in chamber 9 to direct the alkylation of the benzene with the ethylene admixed with the benzene as hereinafter set forth. The benzene heated to the desired temperature leaves heating coil 6 through line 8 containing valve 49 and is admixed with ethylene introduced from either outside sources through line 44 containing valve 45 or formed in a subsequent step of the operation as hereinafter set forth. The mixture of benzene and ethylene is introduced through line 8' into catalyst chamber 9 and is contacted with a suitable alkylating catalyst under operating conditions adequate to produce substantial proportions of ethyl benzene.

The catalyst which may be utilized in chamber 9 may comprise any of the known alkylating catalyst. For example, Friedel-Crafts type catalysts, such as aluminum chloride and zinc chloride either alone or deposited on solid carriers such as alumina, are particularly adaptable for the present operation. Other desirable catalytic agents are those comprising acids of phosphorus deposited on carrying or spacing materials of a porous or adsorptive character, such as kieselguhr, diatomaceous earth or Sil-o-Cel. Although the above catalysts all possess considerable activity they are not necessarily equivalent in their ability to direct the alkylating reaction. However, variations in catalyst activity can be compensated by varying the processing conditions thereby producing the desired rate of conversion. The operating conditions maintained in chamber 9 will be principally dependent on the type of catalyst used. Ordinarily when the catalyst is aluminum chloride, with or without the addition of hydrogen and hydrogen halide, temperatures within the range of 0° C. to 100° C. are utilized. When catalysts such as zinc chloride on alumina and solid phosphoric acid are used the temperature may be considerably increased, but will ordinarily be below 450° C. and above 150° C. The pressure under which the operation is conducted will vary from substantially atmospheric up to about 1000 lbs. per sq. in.

The reaction products will leave chamber 9 through line 10 containing valve 11 and are directed into separator 12 wherein the desired ethyl benzene is separated from the unreacted benzene and ethylene and the higher molecular weight products of the ethylation reactions, such as polyethylbenzenes. The unconverted ethylene may be withdrawn through line 19 containing valve 20 and recycled through line 33 back into the reaction zone. The unconverted benzene is withdrawn through line 13 containing valve 14 and is directed into the suction side of pump 46 which discharges through line 47 containing valve 48 into the suction side of pump 3. The heavy polyethylated hydrocarbons are withdrawn through line 15 containing valve 16 and may be recovered as a product of the reaction or may be catalytically and thermally treated to produce ethyl benzene which may be utilized in subsequent steps of the process. The ethyl benzene is withdrawn through line 17 containing valve 18 and is admixed with ethane introduced through line 21 containing valve 22 and the resultant admixture is directed into heating coil 23 disposed in furnace 24 wherein the ethyl benzene and ethane are dehydrogenated to form substantial amounts of styrene and ethylene, respectively. The operating conditions under which the dehydrogenating reaction in furnace 24 is conducted will be dependent upon the ratio of ethane to ethyl benzene and the rate of conversion desired. In order to decrease decomposition of the styrene formed it is ordinarily desirable to have the proportion of ethane present substantially in excess of the ethyl benzene to obtain the benefits of the diluting or spacing effect of the ethane. The temperature at which the reaction will be conducted will ordinarily be within the range of 650 to 950° C. As stated previously the operating temperature will vary with the mole percent of ethane present in the mixture, the higher temperatures being utilized when a lower percent of ethane is charged. The reaction products leaving line 25 through valve 26 are directed into separator 27 wherein the styrene is separated from the unconverted higher boiling and lower boiling materials. The hydrogen formed during the reaction is withdrawn through line 28 containing valve 29 and may be recovered as a product of the reaction or if a Friedel-Crafts type catalyst is used this hydrogen may be recycled back to the alkylating zone. The ethylene formed during the reaction containing some ethane therein is withdrawn through line 30 containing valve 31 and is directed into the suction side of compressor 22 which discharges through line 33 containing valve 34 back into alkylating zone 9. It may be necessary to add ethylene through line 44 containing valve 45 for only a short period following the starting of the operation, since sufficient ethylene may be recycled through line 33 to furnish the necessary amount for the alkylation of benzene being used. The unconverted ethyl benzene is withdrawn through line 35 containing valve 36 and is directed into the suction side of pump 37 which discharges through line 38 containing valve 39 and is recycled back through coil 23. The high boiling materials formed in the passage of the ethyl benzene and ethane through coil 23 may be withdrawn through line 42 containing valve 43. The styrene is withdrawn through line 40 containing valve 41 and is recovered as a product of the reaction.

In order to simplify the description of the accompanying drawing the fractionation step has been shown as a single tower. However, this is purely for illustrative purposes and it is not intended to limit this invention unduly since any suitable method well known to those skilled in the art, such as solvent extraction, azeotropic distillation, and chemical separations are included within the general broad scope of the invention disclosed herein.

The following example is illustrative of the method of operation which may be accomplished by the utilization of the invention disclosed herein.

A mixture of benzene and ethylene is passed downwardly through a solid phosphoric acid catalyst mass at a temperature of about 220° C. and under a pressure of 50 lbs. per sq. in. The resulting ethyl benzene is admixed with ethane in the following proportions, 60 mol percent ethane and 40 mol percent ethyl benzene. The resulting mixture is thermally dehydrogenated at a temperature of about 775° C. and under a pressure of 150 lbs. to form substantial yields of styrene, and ethylene. The styrene is recovered as a product of the reaction and the ethylene is recycled to the alkylating step.

I claim as my invention:

1. A process for the production of styrene which comprises contacting a mixture of ethylene and benzene with an alkylating catalyst under conditions adequate to produce a substantial yield of ethyl benzene, separating said ethyl benzene from the remaining reaction products, commingling said ethyl benzene with ethane and thermally dehydrogenating said mixture to form substantial yields of styrene and ethylene and recycling the ethylene back to the alkylating step.

2. A process for the production of styrene which comprises contacting benzene and ethylene with a solid phosphoric acid catalyst at a temperature within the range of 150 to 450° C. and under a pressure of substantially atmospheric to about 1000 lbs. per sq. in. superatmospheric, separating the resulting ethyl benzene, commingling said ethyl benzene with ethane and subjecting the resulting mixture to thermal dehydrogenation at a temperature within the range of 650 to 950° C. and under a pressure of substantially atmospheric to 1000 lbs. per sq. in. superatmospheric to form substantial yields of styrene and ethylene, and supplying the latter to the alkylating step.

3. A process for producing styrene which comprises alkylating benzene with ethylene to form ethyl benzene, commingling ethane with the ethyl benzene thus formed, subjecting the resultant mixture to dehydrogenation to produce styrene and ethylene from the ethyl benzene and ethane respectively, separating the styrene from the ethylene and recovering the same, and supplying the ethylene to the aforesaid alkylating step.

GUSTAV EGLOFF.